US010734879B2

(12) United States Patent
Huard

(10) Patent No.: US 10,734,879 B2
(45) Date of Patent: Aug. 4, 2020

(54) CORNERING LINEAR MOTOR

(71) Applicant: Parker-Hannifin Corporation, Cleveland, OH (US)

(72) Inventor: Steven Roger Huard, New Ulm, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 221 days.

(21) Appl. No.: 15/558,819

(22) PCT Filed: Jan. 15, 2016

(86) PCT No.: PCT/US2016/013624
§ 371 (c)(1),
(2) Date: Sep. 15, 2017

(87) PCT Pub. No.: WO2016/171773
PCT Pub. Date: Oct. 27, 2016

(65) Prior Publication Data
US 2018/0083522 A1      Mar. 22, 2018

Related U.S. Application Data

(60) Provisional application No. 62/151,453, filed on Apr. 23, 2015.

(51) Int. Cl.
  *H02K 41/03*     (2006.01)
  *H02K 29/03*     (2006.01)
  *H02K 41/025*    (2006.01)
(52) U.S. Cl.
  CPC .......... *H02K 41/031* (2013.01); *H02K 29/03* (2013.01); *H02K 41/025* (2013.01); *H02K 2201/03* (2013.01)

(58) Field of Classification Search
  CPC .... H02K 41/031; H02K 41/025; H02K 29/03; H02K 2201/03
  See application file for complete search history.

(56) References Cited

U.S. PATENT DOCUMENTS 1,716,448 A       6/1929  Langsdorf
4,542,312 A  *    9/1985  Kawamura ............. H05B 6/34
                                                    310/13
(Continued)

FOREIGN PATENT DOCUMENTS

DE   10 2006 035674 A1    2/2008
DE   10 2007 026674       12/2008
KR      2008 0035538 A     4/2008

OTHER PUBLICATIONS

International Search Report and Written Opinion for International Application No. PCT/US2016/171773, dated Apr. 18, 2016.
(Continued)

*Primary Examiner* — Thienvu V Tran
*Assistant Examiner* — Bart Iliya
(74) *Attorney, Agent, or Firm* — Renner, Otto, Boisselle & Sklar, LLP

(57) ABSTRACT

A linear motor includes a forcer having a plurality of teeth spaced apart along a longitudinal axis of the forcer. At least some teeth arranged about a longitudinal center of the forcer are dimensioned different from at least some other teeth arranged at ends of the forcer distal from the longitudinal center. The teeth may be dimensioned to define a pocket relative to the longitudinal axis of the forcer.

16 Claims, 4 Drawing Sheets

(56) References Cited

U.S. PATENT DOCUMENTS

| | | | |
|---|---|---|---|
| 2002/0053849 A1 | 5/2002 | Corcoran | |
| 2002/0117910 A1 | 8/2002 | Wauke | |
| 2004/0251764 A1* | 12/2004 | Groening | H02K 3/28 |
| | | | 310/184 |
| 2006/0244331 A1* | 11/2006 | Groening | H02K 1/276 |
| | | | 310/156.38 |
| 2010/0007223 A1* | 1/2010 | Denne | H02K 3/26 |
| | | | 310/12.22 |
| 2016/0218608 A1* | 7/2016 | Floresta | H02K 41/02 |

OTHER PUBLICATIONS

International Preliminary Report on Patentability for International Application No. PCT/US2016/171773, dated Aug. 7, 2017.

* cited by examiner

CORNERING LINEAR MOTOR

RELATED APPLICATION DATA

This application is a National Stage of international application no. PCT/US2016/013624, filed on Jan. 16, 2016 which claims priority of U.S. Provisional Application No. 62/151,453 filed on Apr. 23, 2015, which is are incorporated herein by reference in their entirety.

FIELD OF INVENTION

The present disclosure relates generally to linear motors, and more particularly to a linear motor which offers improved performance when traveling over curved sections.

BACKGROUND

Linear motors are known in the art. According to a typical configuration, a linear motor includes an armature (sometimes referred to as a forcer), the armature including a yoke made up of a pack of ferromagnetic laminations. The yoke includes a plurality of teeth arranged at a predefined pitch, with a plurality of slots respectively separating the teeth. The armature further includes coil windings wound around the teeth and housed in the respective slots.

Linear motors also typically include a magnetic stator (sometimes referred to as a track or rail). The magnet track includes a plurality of plate-like permanent magnets positioned linearly along the track at a predefined pitch with corresponding gaps therebetween. The armature travels along the length of the magnet track with the teeth of the armature adjacent the magnets. The position of the armature is determined via a sensor, and a controller controls the current provided to the coil windings based on the armature position. In this manner, the armature may be selectively driven back and forth along the magnet rail.

While the exemplary linear motor is described with the armature arranged on the moving member and the magnets arranged on the track, it should be appreciated that the configuration may be swapped. For example, the armature may be arranged on the track and the magnets may be arranged on the moving member.

Linear motors such as those described above are quite useful in a variety of applications. These applications include, but are not limited to, control systems, manufacturing processes, robotics, etc. Linear motors provide precision linear movement in a whole host of applications.

Despite the recognized advantages associated with known linear motors, there have been a number of drawbacks. For example, when traveling on curved sections of track it is desirable for the linear motor exhibit performance similar to that when traveling on straight sections of track. However, conventional linear motors do not exhibit such performance, and instead have reduced performance on the curved sections of track.

Thus, a need exists for a linear motor that provides similar performance on both straight and curved portions of track.

SUMMARY OF INVENTION

Performance of conventional linear motors suffers on curved sections of track due to variations in air gap between the armature and the magnets. More particularly, when on the curved sections an air gap between the armature teeth and the magnets along the edges of the "flat" armature are larger than an air gap between the armature teeth and the magnets at the center of the armature, thus resulting in less overall force being produced. The difference in performance becomes greater as a width of the armature becomes larger relative to the radius of the curved section.

The present disclosure describes a linear motor that includes features that enable nearly the same performance on a curved section of track and a flat (straight) section of track. More particularly, a motor path includes straight sections and curved sections of track that can be assembled to form a continuous or non-continuous path, the track including one of magnets or coils for generating a magnetic field. The linear motor also includes a moving member having the other of the magnets or coils. By energizing the coils, a force is generated that propels the moving member along the path. The moving member contains a flat section that interacts with a flat portions of the track during operation on the flat sections of the path, and it contains a pocket section that interacts with a curved portions of the track during operation on the curved section of the path.

Preferably, the curved section and the flat section of the moving member are approximately equal in length so that the force on the curved section is approximately the same as the force on the straight section. Coils carrying current on one of the track or the moving member create a magnetic field that interacts with magnets on the other of the track or the moving member in order to create force in the direction of movement.

According to one aspect of the disclosure, a linear motor includes: a first member having a plurality of teeth spaced apart along a longitudinal axis of the first member, wherein at least some teeth arranged about a longitudinal center of the first member are dimensioned different from at least some other teeth arranged at ends of the first member distal from the longitudinal center.

According to one aspect of the disclosure, a linear motor includes: a first member having a plurality of teeth spaced apart along a longitudinal axis of the first member, wherein the plurality of teeth are dimensioned to define a pocket relative to the longitudinal axis of the first member.

According to one aspect of the disclosure, at least some teeth arranged about the longitudinal center of the first member are shorter than the at least some other teeth arranged at the ends of the first member.

According to one aspect of the disclosure, the plurality of teeth define a curved shape relative to the longitudinal axis.

According to one aspect of the disclosure, the plurality of teeth define a concave region in the first member.

According to one aspect of the disclosure, the linear motor is a three-phase linear motor for operation with alternating current power having phase A, phase B and phase C, and individual teeth associated with phase B are configured to produce less force than individual teeth associated with phase A and phase C.

According to one aspect of the disclosure, each tooth of the plurality of teeth comprises a respective winding.

According to one aspect of the disclosure, the windings are asymmetrically wound.

According to one aspect of the disclosure, the windings for some teeth of the plurality of teeth have a greater number of turns than the windings of other teeth of the plurality of teeth.

According to one aspect of the disclosure, the respective windings have a wire gauge that is different from a wire gauge of other windings.

According to one aspect of the disclosure, each winding spans more than one tooth.

According to one aspect of the disclosure, the forcer is stationary and a short section of magnet constructed with a pocket in the moving member.

According to one aspect of the disclosure, the linear motor is an induction motor or a switch reluctance motor.

According to one aspect of the disclosure, the linear motor includes a second member having a magnetic surface.

According to one aspect of the disclosure, the first member comprises one of a forcer and the second member comprises a track.

According to one aspect of the disclosure, a surface of the second member is configured to cooperate with the first member to effect motion of one of the first member or the second member relative to the other of the first member or the second member, the surface of the second member comprising a curved portion.

According to one aspect of the disclosure, a method of constructing a linear motor includes forming a first member with a plurality of teeth spaced apart along a longitudinal axis of the first member such that at least some teeth arranged about a longitudinal center of the first member are dimensioned different from at least some other teeth arranged at ends of the first member distal from the longitudinal center.

According to one aspect of the disclosure, forming the first member includes dimensioning the plurality of teeth to define a pocket relative to the longitudinal axis of the first member.

According to one aspect of the disclosure, forming the first member includes forming the at least some teeth arranged about the longitudinal center of the first member shorter than the at least some other teeth arranged at the ends of the first member.

According to one aspect of the disclosure, the method includes providing a conductive winding for each tooth, wherein the windings are asymmetrically wound.

According to one aspect of the disclosure, providing a conductive winding includes providing windings for some teeth of the plurality of teeth with a greater number of turns than windings provided to other teeth of the plurality of teeth.

According to one aspect of the disclosure, providing a conductive winding includes using a wire gauge for some windings that is different from a wire gauge of other windings.

According to one aspect of the disclosure, a linear motor includes: a first member having a first surface that defines a first planar contour and a first non-planar contour; and a second member having a second surface that defines a second planar contour and a curved contour, the second surface arranged adjacent the first surface and cooperative with the first planar contour and the first non-planar contour to effect relative movement between the first member and the second member along a path defined by the second member.

According to one aspect of the disclosure, the first member comprises one of a plurality of magnets or a plurality of windings, and the second member comprises the other of the plurality of magnets and the plurality of windings.

According to one aspect of the disclosure, the non-planar contour comprises at least one of a concave shape or a convex shape.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Figure 1A:
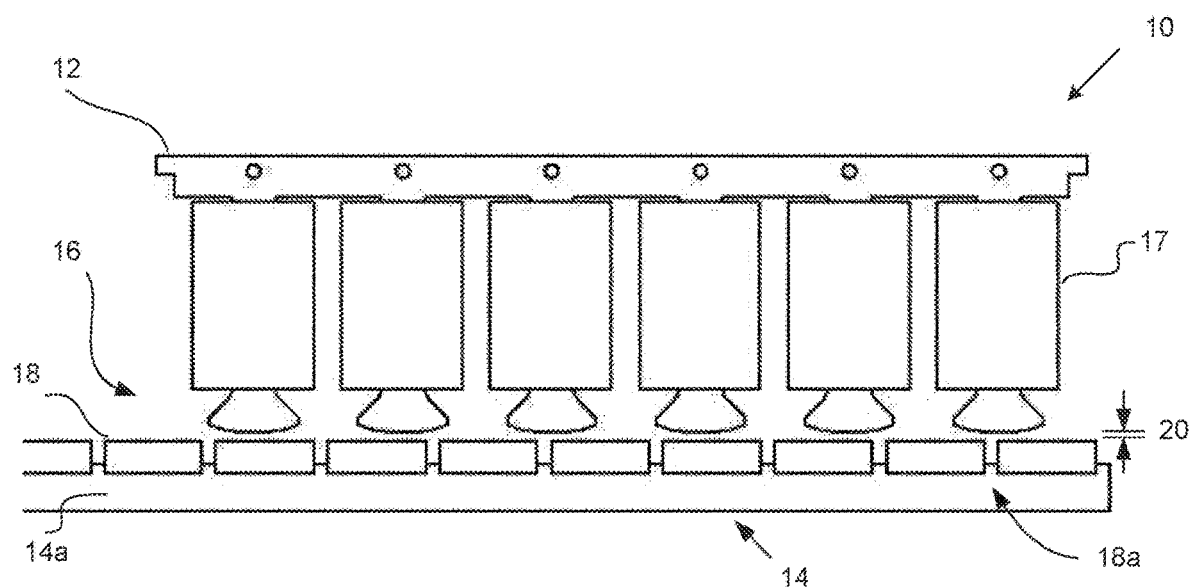
FIG. 1A is a schematic diagram of a conventional linear motor and a straight section of track.

The present invention will now be described with reference to the drawings, wherein like reference numerals are used to refer to like elements throughout.

A linear motor typically comprises a stator, a linearly movable armature as well as drive and control electronics. In order to move the armature, as a rule, either the stator or the armature is provided with excitable windings, i.e., drive windings, and, correspondingly, either the armature or the stator is provided with permanent magnetic excitation. The permanent magnetic excitation is most commonly generated by means of permanent magnets arranged in a certain manner. Whether the permanent magnets are disposed in the stator or in the armature and, accordingly, whether the excitable windings are disposed in the armature or in the stator, are determined by the desired field of use and/or the conditions there.

With reference to FIG. 1A, illustrated is a conventional linear motor 10 having a forcer (armature) 12 arranged relative to a flat section 14a of a track 14 (stator). The forcer 12 includes a plurality of teeth 16, each tooth having a winding 17 surrounding the respective tooth, the windings operative to generate a magnetic field. The track 14 includes a plurality of plate-like permanent magnets 18. The magnets 18 are positioned linearly along the track 14 at a predefined pitch with corresponding gaps 18a therebetween. The magnet track 14 may be made of molded or machined plastic, fiberglass, metal or the like, with the permanent magnets 18 molded, glued, or otherwise retained therein. The magnetic field corresponding to each tooth interacts with magnetic portions 18 of the track 14 so as to effect movement of the forcer 12 relative to the track 14.

During operation, the forcer 12 travels along the length of the magnet track 14 with the teeth 16 of the yoke adjacent the magnets 18. As is known, current is applied to the coil windings 17 within the forcer 12 based on the relative position of the teeth 16 to the permanent magnets 18. A traveling magnetic wave is created which propels the forcer 12 along the length of the magnet track 14.

As can be seen in FIG. 1A, an air gap 20 is formed between each tooth 16 and the flat section 14a of the track 14, the air gap being constant among the plurality of teeth 16. Such constant air gap 20 between teeth 16, which may be referred to as a flat-forcer configuration, produces a constant linear force as the forcer 12 moves along the track 14.

Figure 1B:
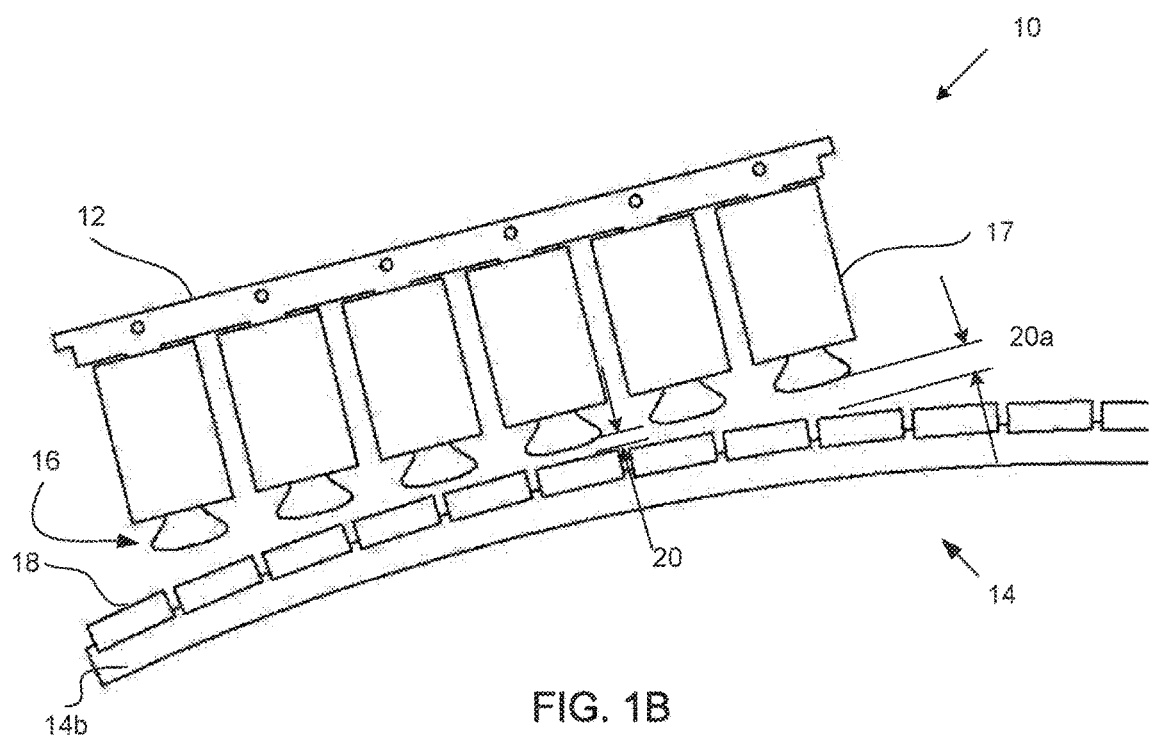
FIG. 1B is a schematic diagram of the conventional linear motor and a curved section of track.

With reference to FIG. 1B, as the forcer 12 travels over a curved section 14b of the track 14, an air gap 20a between the outer teeth (the two distal teeth on each end of the forcer) and the track 14b is significantly larger than the air gap 20 between the inner teeth (the two central teeth) and the track 14. As a result, the force constant and the inductance of the forcer 12 is reduced, the reduction being dependent on the quotient of the radius of the curved portion 14b and the width of the forcer 12.

If the forcer 12 is made narrow relative to the curve radius, then the difference in the force constant between the flat section 14a and the curved section 14b of the track 14 is small. For a forcer that is wide compared to the radius of the curved portion 14b (i.e., a width/radius ratio greater than 0.25), the force constant on the curved section 14b of track 14 could be 50% or less than the force constant on the flat section 14a of track 14. If the forcer 12 is stopped on the curved section 14b of track 14 and then accelerated at the maximum acceleration rate, the forcer 12 will need twice the amount of time to accelerate relative to the time required when the forcer 12 is on the flat section 14a of the track 14.

If additional force is required from the forcer 12 for the curved sections 14b, the width of the forcer 12 will need to be increased in a direction perpendicular to travel. As will be appreciated, such width increase will require a larger, heavier, and more expensive magnet track. The material forming the magnets can be expensive relative to the other components, especially if rare earth magnet materials are used. Therefore, such wider systems can be cost prohibitive.

Figure 2A:
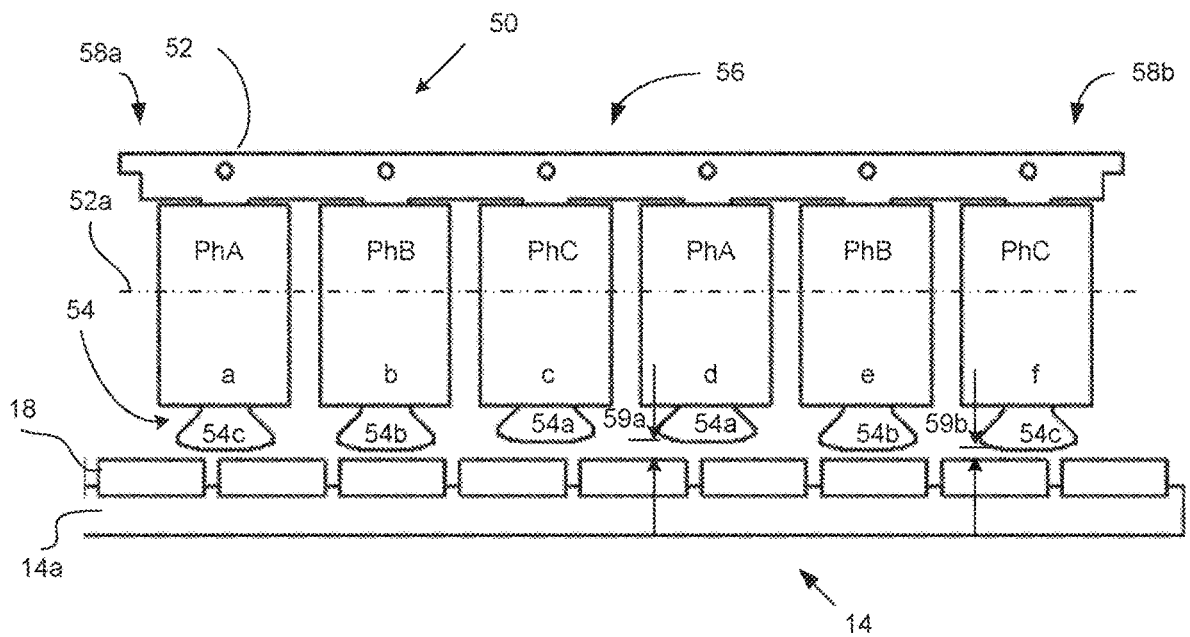
FIG. 2A is a schematic diagram of a linear motor in accordance with the present disclosure and a straight section of track.
Figure 2B:
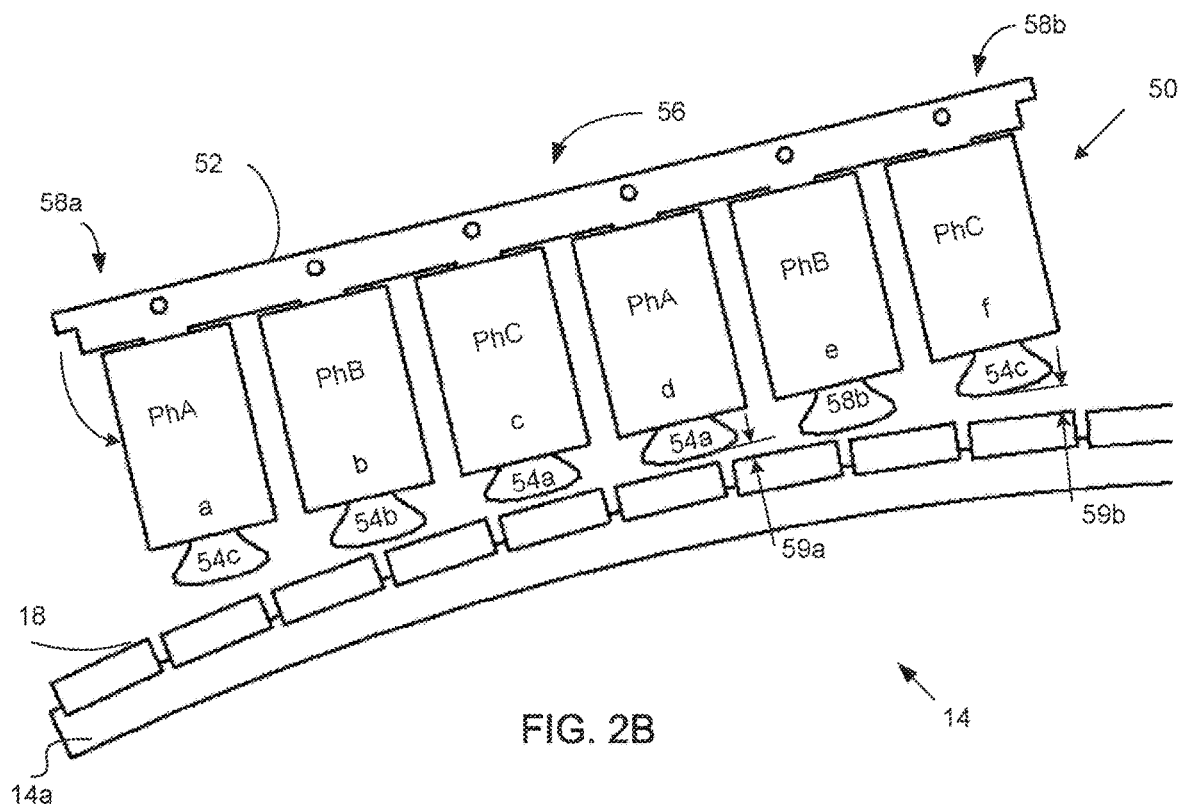
FIG. 2B is a schematic diagram of the exemplary linear motor of FIG. 2A and a curved section of track.

Referring now to FIGS. 2A and 2B, illustrated is an exemplary linear motor 50 in accordance with the present disclosure. The linear motor 50, which may be an induction motor, a switch reluctance motor, or any other motor suitable for linear movement, includes a track 14 having both a flat section 14a and a curved section 14b. The track (also referred to as a second member) includes a magnetic surface formed by magnets 18 (active or passive) for interaction with a forcer 52 (also referred to as a first member). The forcer 52 includes a plurality of teeth 54 spaced apart along a longitudinal axis 52a of the forcer 52. At least some of the teeth arranged along the longitudinal axis 52a of the forcer 52 about a center portion 56 are shorter in length than at least some other teeth arranged at opposite ends 58a, 58b distal from the center portion 52.

For example, in one embodiment the inner-most teeth 54a (the teeth near a center portion 56 of the forcer 52) are configured to have a length L1, while the mid-teeth 54b and the outer-most teeth 54c (the teeth at the ends 58a, 58b of the forcer 52) have a length L2, where L2>L1. By dimensioning the teeth differently, a pocket is defined relative to an imaginary line connecting the bottom of the outer-most teeth 54c. In another embodiment, the inner-most teeth have a first length L1, the next inner-most teeth have a second length L2, and the outer-most teeth have a third length L3, where L3>L2>L1. Such configuration can be used to fine-tune the contour of the pocket to match the curvature of the track.

In one embodiment, the pocket has a concave profile for movement of the forcer 52 about an outer radius of the track 14 (e.g., the outer teeth are longer than the inner teeth). In another embodiment, the pocket has a convex profile movement of the forcer 52 about an inner radius of the track 14 (e.g., the outer teeth are shorter than the inner teeth—not shown). As can be seen in FIG. 2A, an air gap 59a corresponding to the inner teeth 54a (the pocket) is larger than an air gap 59b corresponding to the outer teeth 54c.

When the linear motor 50 is on the flat section 14a of the track 14, a first group of four of the six teeth 54 primarily interact with the flat section 14a of the track 14. Further, when the linear motor 50 is on the curved section 14b of the track 14, a second different group of four of the six teeth 54 interact with the curved section 14b of the track 14. Such interaction is due to the pocket formed in the forcer 52, which creates a good balance in the force constant between the flat section 14a and the curved section 14b of the track 14.

In order to further reduce an unbalance within the phases of the forcer, asymmetric windings can be implemented. More particularly, in FIGS. 2A and 2B teeth "a" and "d" correspond to phase A (PhA), teeth "b" and "e" correspond to phase B (PhB), and teeth "c" and "f" correspond to phase C (PhC). Examining the balance between the phases between the straight section 14a and curved section 14b of track 14, both phases A and C have one tooth down and one tooth elevated when traversing over the flat section 14a or the curved section 14b. However, phase B (teeth "b" and "e") will have both teeth down when traversing both the flat section 14a and the curved section 14b. This results in phase B having a higher force constant as compared to phase A and phase C.

In order to balance both the resistance and force constant between phases, individual teeth associated with phase B can be configured to produce less force than teeth associated with phase A and phase C. Thus, while teeth associated with phase B may individually produce less force than individual teeth associated with phase A and phase C, due to phase B always having two teeth down while traversing the track (compared to only one tooth being down for phase A and phase C), the net force produced by the respective phases is approximately the same.

Figure 3A:
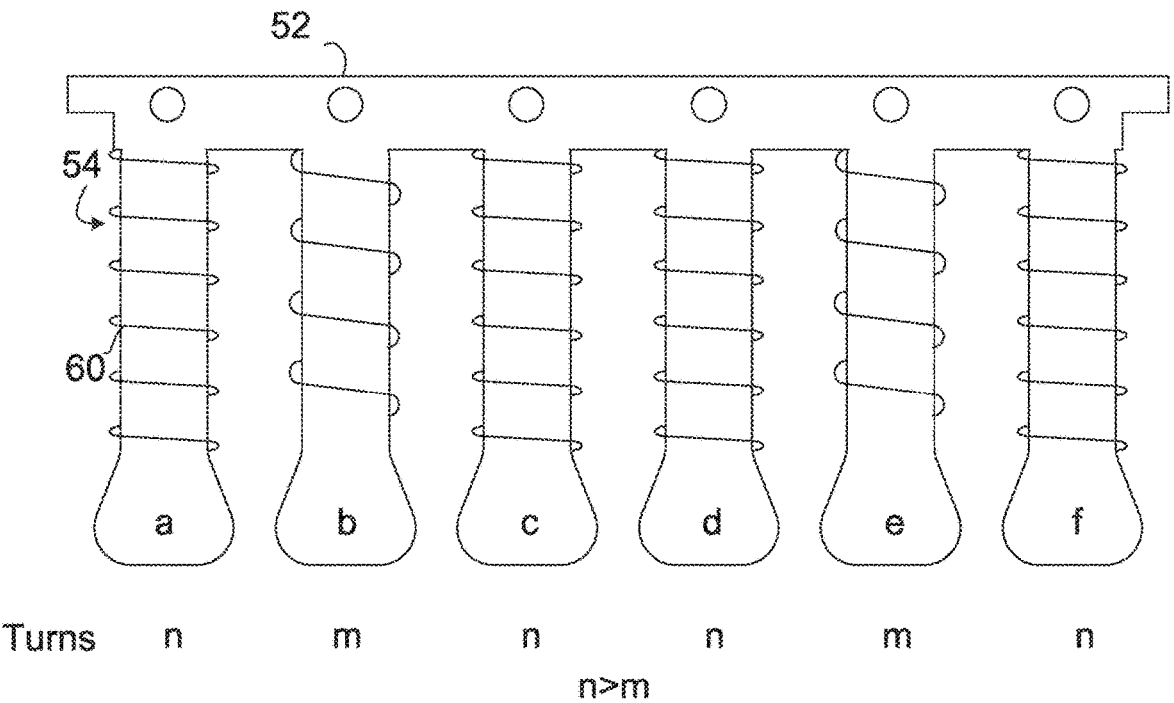
FIG. 3A is a schematic diagram of a linear motor having coils wound in accordance with an embodiment of the present disclosure.

Asymmetrically wound windings can help equalize the force produced between the respective phases. With reference to FIG. 3A, each tooth may have a corresponding winding 60 of conductive wire, where windings associated with some teeth 54 (e.g., teeth "a", "c", "d" and "f" associated with phases A and C) have more turns than windings associated with other teeth 54 (e.g., teeth "b" and "e" associated with phase B). For example, teeth "a", "c", "d" and "f" may have windings 60 with "n" turns, while teeth "b" and "e" may have windings 60 with "m" turns, where "n" is greater than "m". Thus, due to the lesser number of turns, teeth "b" and "e" will individually produce less force than the individual force produced by teeth "a", "c", "d" and "f". However, and as noted above, this individual decrease in force produced by teeth "b" and "e: is offset by the force produced by the collective combination of teeth "b" and "e" (i.e., teeth associated with phase B) such that the overall force generated by teeth associated with phase B is substantially equal to the force generated by teeth associated with phase A and phase C. Specifically, and as noted above, the teeth associated with phases A and C only have one tooth in close proximity to the track at any location on the track, while the teeth associated with phase B are both in close proximity to the track at any location on the track. Thus, while teeth "b" and "e" individually produce less force when compared to the individual force produced by teeth "a", "c", "d" and "f", two teeth are in close proximity to the track 14 at all times while teeth "a", "c", "d" and "f", although individually capable of producing more force per tooth than teeth "b" and "e", have one tooth in close proximity to the track 14.

Figure 3B:
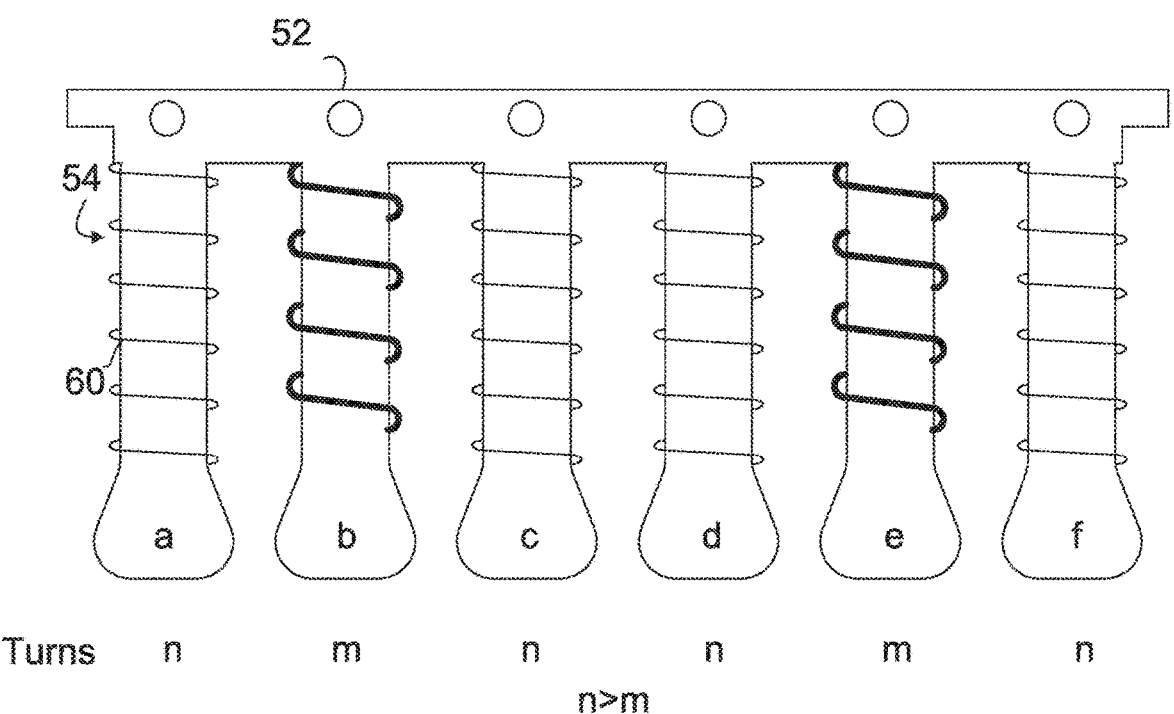
FIG. 3B is a schematic diagram of a linear motor having coils wound in accordance with another embodiment of the present disclosure.

Additionally, a wire gauge of some windings 60 may be different from a wire gauge of other windings. FIG. 3B illustrates such configuration, where windings for teeth "b" and "e" have windings formed from larger gauge wire that that of teeth "a", "c", "d" and "f". A purpose of using a different wire gauge for teeth "b" and "e" is so that the resistance of phase B, with less turns on it, can be equal to the resistance of phases A and C.

Figure 4A:
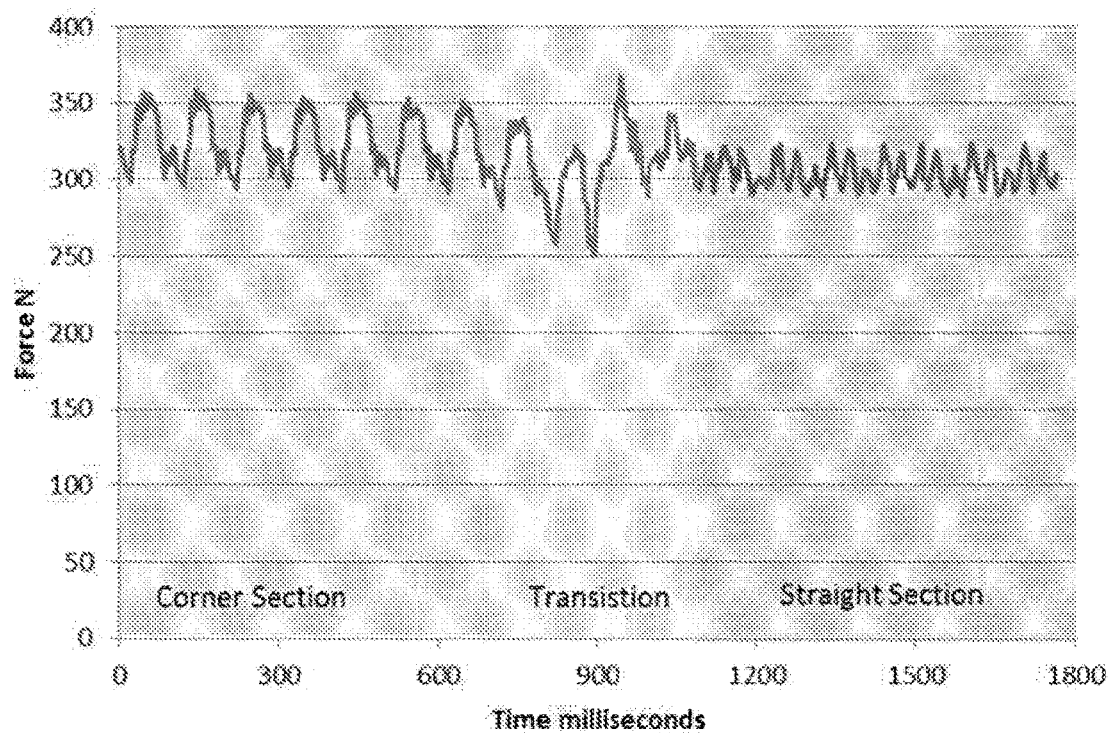
FIG. 4A is a graph showing the force produced by a linear motor in accordance with the present disclosure during a transition from a curved section to a straight section of track.
Figure 4B:
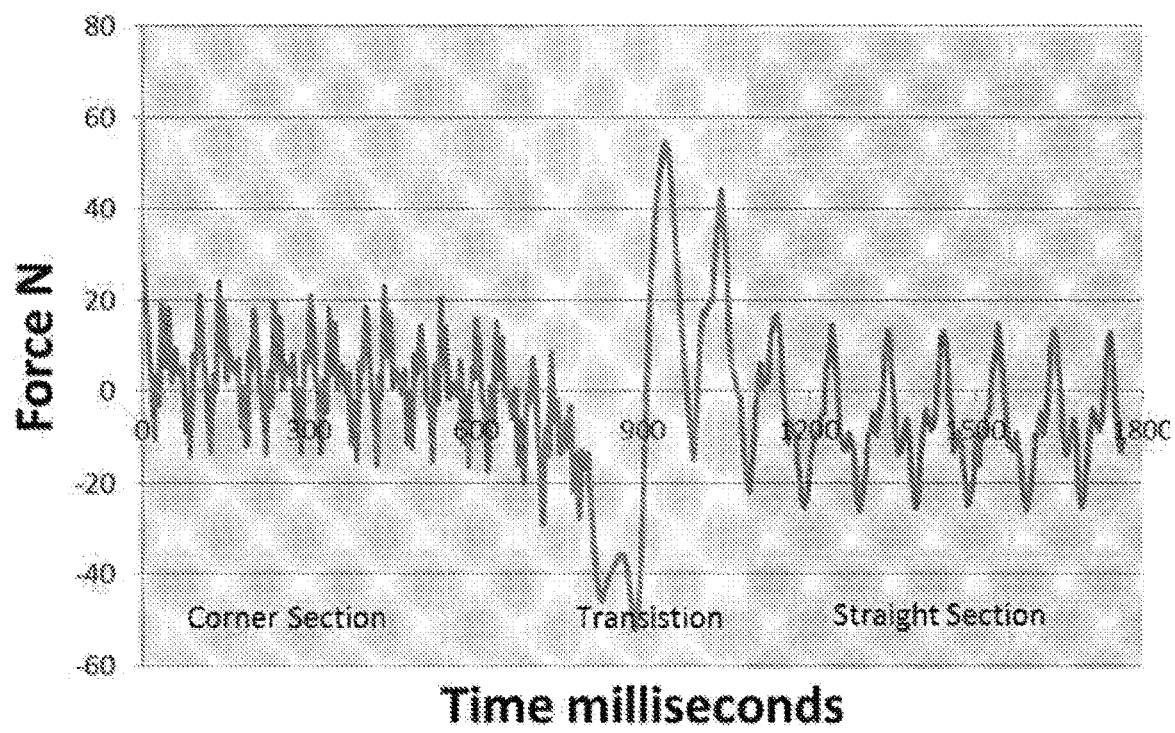
FIG. 4B is a graph showing the cogging force experienced by a linear motor in accordance with the present disclosure during a transition from a curved section to a straight section of track.

Referring now to FIGS. 4A and 4B, illustrated are performance graphs for a linear motor in accordance with the present disclosure. FIG. 4A illustrates the force produced by the linear motor 50, while FIG. 4B illustrates the cogging effect experienced by the linear motor 50.

As can be seen in FIG. 4A, the force between the curved sections 14b and straight sections 14a is within 25 Newtons, with a slight bump in the transition region between the curved and straight sections. Thus, the force produced in the respective sections is similar. Regarding the bump at the transition region, this not that significant at rated force of the motor. Note also that the ripple force is less than 15% on corners, less than 10% on straights, and a short transition ripple of 35%.

FIG. 4B illustrates the cogging force experienced during a transition from a curved section 14b to a straight section 14a of track. As can be seen, the forcer 52 experiences a force that resists entry into the transition region. However, the cogging force is relatively small when compared to the force produced by the motor (see FIG. 4A) and thus it should not cause the forcer to get stuck.

It is noted that while the exemplary linear motor is described with the windings arranged on the first (moving) member and the magnets arranged on the second (fixed) member, the arrangement may be reversed. For example, the magnets may be arranged on the first (moving) member, the magnets configured to produce a convex or concave contour as described above. Further, teeth including windings may be arranged on the second (fixed) member. Energizing the windings of the second member then produces a force that interacts with the magnets of the first member, thereby causing the first member to move relative to the second member.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A linear motor, comprising:
    a first member having a plurality of teeth spaced apart along a longitudinal axis of the first member, wherein at least some teeth arranged about a longitudinal center of the first member are dimensioned different from at least some other teeth arranged at ends of the first member distal from the longitudinal center; and
    a second member having one of magnets or coils, wherein at least a first portion of the second member is arranged in a straight section and at least a second portion of the second member is arranged in a curved section, and the at least some teeth interact with the straight section and the at least some other teeth interact with the curved section to provide a balance in a force constant between the straight section and the curved section of the second member.

2. The linear motor according to claim 1, wherein the at least some teeth arranged about the longitudinal center of the first member are shorter than the at least some other teeth arranged at the ends of the first member.

3. The linear motor according to claim 1, wherein the plurality of teeth define a curved shape relative to the longitudinal axis.

4. The linear motor according to claim 1, wherein the plurality of teeth define at least one of a concave region or a convex region in the first member.

5. The linear motor according to claim 1, wherein the linear motor is a three-phase linear motor for operation with alternating current power having phase A, phase B and phase C, and teeth associated with phase B are configured to produce less force than teeth associated with phase A and phase C.

6. The linear motor according to claim 1, wherein each tooth of the plurality of teeth comprises a respective winding.

7. The linear motor according to claim 6, wherein the windings are asymmetrically wound.

8. The linear motor according to claim 6, wherein a first wire gauge of some windings is different from a second wire gauge of other windings.

9. The linear motor according to claim 1, wherein the windings for some teeth of the plurality of teeth have a greater number of turns than the windings of other teeth of the plurality of teeth.

10. The linear motor according to claim 1, wherein the linear motor is an induction motor or a switch reluctance motor.

11. The linear motor according to claim 1, wherein the first member comprises a forcer and the second member comprises a track.

12. The linear motor according to claim 11, wherein a surface of the second member is configured to cooperate with the first member to effect motion of one of the first member or the second member relative to the other of the first member or the second member.

13. A linear motor, comprising:
    a first member having a plurality of teeth spaced apart along a longitudinal axis of the first member, wherein the plurality of teeth are dimensioned to define a pocket relative to the longitudinal axis of the first member; and
    a second member having one of magnets or coils, wherein at least a first portion of the second member is arranged in a straight section and at least a second portion of the second member is arranged in a curved section, and the at least some teeth interact with the straight section and the at least some other teeth interact with the curved section to provide a balance in a force constant between the straight section and the curved section of the second member.

14. A linear motor, comprising:

a first member having a first surface that defines a first planar contour and a first non-planar contour, the first member including a plurality of teeth spaced apart along a longitudinal axis of the first member, wherein at least some teeth arranged about a longitudinal center of the first member are dimensioned different from at least some other teeth arranged at ends of the first member distal from the longitudinal center, wherein each tooth of the plurality of teeth comprises a respective winding, and wherein the windings are asymmetrically wound; and a second member having a second surface that defines a second planar contour and a curved contour, the second surface arranged adjacent the first surface and cooperative with the first planar contour and the first non-planar contour to effect relative movement between the first member and the second member along a path defined by the second member, wherein the at least some teeth interact with the planar contour and the at least some other teeth interact with the curved contour to provide a balance in a force constant between the planar contour and the curved contour of the second member.

15. The linear motor according to claim 14, wherein the second member comprises at least one of a plurality of magnets and a plurality of windings.

16. The linear motor according to claim 14, wherein the non-planar contour comprises at least one of a concave shape or a convex shape.

* * * * *